United States Patent
Bastioli et al.

(10) Patent No.: US 7,176,251 B1
(45) Date of Patent: *Feb. 13, 2007

(54) BIODEGRADABLE POLYMERIC COMPOSITIONS COMPRISING STARCH AND A THERMOPLASTIC POLYMER

(75) Inventors: Catia Bastioli, Novara (IT); Vittorio Bellotti, Fontaneto D'Agogna (IT); Gian Domenico Cella, Novara (IT); Luciano Del Giudice, Milan (IT); Sandro Montino, Robbio Lomellina (IL); Gabriele Perego, Milan (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/297,733

(22) PCT Filed: Nov. 5, 1997

(86) PCT No.: PCT/EP97/06103

§ 371 (c)(1),
(2), (4) Date: Jul. 1, 1999

(87) PCT Pub. No.: WO98/20073

PCT Pub. Date: May 14, 1998

(30) Foreign Application Priority Data

Nov. 5, 1996 (IT) ............... TO96A0890
Dec. 9, 1996 (IT) ............... TO96A0996

(51) Int. Cl.
 C08L 3/00 (2006.01)
 C08K 5/04 (2006.01)
 C08K 5/10 (2006.01)
 C07C 57/13 (2006.01)
 C07C 67/08 (2006.01)

(52) U.S. Cl. .............. 524/47; 524/308; 524/309; 524/310; 524/311; 524/313; 524/314; 524/319

(58) Field of Classification Search .......... 524/47, 524/312, 308, 309, 310, 311, 313, 314, 319
See application file for complete search history.

(56) References Cited

U.S. PATENT DOCUMENTS

| 5,412,005 | A | | 5/1995 | Bastioli et al. |
| 5,874,486 | A | * | 2/1999 | Bastioli et al. ............ 523/128 |
| 6,277,899 | B1 | * | 8/2001 | Bastioli et al. ............ 523/128 |
| 6,348,524 | B2 | * | 2/2002 | Bastioli et al. ............ 524/47 |
| 2002/0006989 | A1 | * | 1/2002 | Bastioli et al. ............ 524/47 |

FOREIGN PATENT DOCUMENTS

| EP | 0 516 030 A2 | 5/1992 |
| EP | 0 596 437 A2 | 11/1993 |
| EP | 0 722 980 A1 | 7/1996 |
| WO | WO 92/19680 | 5/1992 |
| WO | WO 93/00399 | 6/1992 |
| WO | WO 94/03543 | 2/1994 |
| WO | WO 95/24447 | 3/1995 |

* cited by examiner

*Primary Examiner*—Nathan M. Nutter
(74) *Attorney, Agent, or Firm*—Bryan Cave LLP; Charles M. Avigliano

(57) ABSTRACT

The present invention provides polymeric compositions containing thermoplastic starch and a thermoplastic polymer incompatible with starch, in which the starch constitutes the dispersed phase and the thermoplastic polymer constitutes the continuous phase, selected: A) from compositions comprising an agent with an interfacial effect selected from esters of polyols with mono- or polycarboxylic acids with dissociation constants within certain limits, the esters having specific values of the hydrophilic/lipophilic balance index HLB or being amongst the non-ionic surfactants which are soluble in water but cannot significantly be extracted by water from the compositions which contain them; B) from compositions wherein the thermoplastic polymer is an aliphatic or aliphatic-aromatic copolyester wherein the ratio (R) between the average viscometric molecular weight and the melt index is greater than 25,000 and C) from compositions wherein the thermoplastic polymer is selected from aliphatic-aromatic copolyesters, polyester-amides, polyester-esters, polyester-ether-amides, polyester-urethanes and polyester-ureas and wherein the compositions are obtained by extrusion of the component maintaining a water content during the mixing stage from 1 to 5% by weight.

19 Claims, No Drawings

BIODEGRADABLE POLYMERIC COMPOSITIONS COMPRISING STARCH AND A THERMOPLASTIC POLYMER

The present invention relates to biodegradable polymeric compositions with good resistance to ageing and to low humidities, comprising thermoplastic starch and a thermoplastic polymer incompatible with starch. In these compositions, starch constitutes the dispersed phase and the thermoplastic polymer constitutes the continuous phase.

The invention relates in particular to biodegradable compositions which can maintain a high tear strength in conditions of low humidity.

It is known that the mechanical properties, particularly the tear strength, of products (films) produced from compositions comprising thermoplastic starch and a thermoplastic polymer incompatible with starch in which the starch constitutes the dispersed phase undergo considerable deterioration because the starch gives up or absorbs water until it achieves equilibrium with the ambient humidity.

In conditions of relatively low humidity, for example 20% humidity, the material tends to become fragile since the dispersed phase becomes insufficiently plasticized because of the loss of water which raises the glass transition point above the ambient temperature.

In these conditions, when the starch particles constituting the dispersed phase are stressed they cannot deform and absorb the stress but remain rigid, thus initiating tearing.

Water is a very effective plasticizer of the starchy phase; however, it has the disadvantage that it is volatile and that its concentration fluctuates in order to achieve equilibrium with the ambient humidity. High-boiling plasticizers such as glycerol, sorbitol, etherified or esterified sorbitol, ethylene glycol, trimethylol propane, pentaerythritol and polyols in general are therefore preferred.

Some of the water present during the plasticizing of the starch is supplied by the starch itself and some may be added.

Upon completion of the plasticizing and the mixing of the components, the water is removed by degassing to give a final content of about 1–3% by weight.

Water, like high-boiling plasticizers, modifies the viscosity of the starch phase and affects the rheological properties of the starch/polymer system, helping to determine the dimensions of the dispersed particles.

The most effective high-boiling plasticizers (glycerol in particular) tend to be lost from the system either because of evaporation in a ventilated atmosphere, particularly if the humidity undergoes cyclic variations, or by migration in contact with other hydrophilic materials such as cellulose.

In both cases, the concentration of plasticizer is no longer sufficient to keep the Tg of the dispersed phase below the temperature of use and the material becomes fragile.

To prevent this problem, plasticizers such as, for example, sorbitol, sorbitol mono-ethoxylate and trimethylol propane, which do not migrate and do not evaporate, have been used.

The effectiveness of these plasticizers, however, is quite low and the final characteristics of the material are worse than those obtained with the use of more effective plasticizers such as glycerol, particularly in conditions of low humidity.

To prevent the problems which arise in dry conditions, it has also been attempted to bring the Tg of the dispersed phase back to values below the temperature of use by increasing the quantity of high-boiling plasticizer. This gives rise to too soft a "feel" of the material when it is in the 50% relative humidity conditions in which the material is normally calibrated to achieve the maximum performance.

It has now unexpectedly been found that the problem of providing biodegradable heterophase compositions comprising thermoplastic starch and a thermoplastic polymer incompatible with starch in which starch constitutes the dispersed phase and the polymer constitutes the continuous phase capable of maintaining high mechanical properties even in conditions of low relative humidity can be solved by using a composition selected from the following ones:

A) Compositions prepared by extrusion of the components in the presence of an interfacial agent selected from the group consisting of:

a) esters which have hydrophilic/lipophilic balance index values (HLB) greater than 8 and which are obtained from polyols and from mono- or polycarboxylic acids with dissociation constants pK lower than 4.5 (the value relates to the pK of the first carboxyl group in the case of polycarboxylic acids);

b) esters with HLB values of between 5.5 and 8, obtained from polyols and from mono- or polycarboxylic acids with less than 12 carbon atoms and with pK values greater than 4.5 (this value relating to the pK of the dissociation of the first carboxyl group in the case of polycarboxylic acids);

c) esters with HLB values lower than 5.5, obtained from polyols and from fatty acids with 12–22 carbon atoms, used in quantities of from 10 to 40% by weight relative to the starch;

d) non-ionic, water-soluble surfactants which, when added to the starch/thermoplastic polymer heterophase compositions indicated above, migrate in water by no more than 30% of their concentration after the material containing them has been immersed in water for 100 hours at ambient temperature;

e) reaction products of an aliphatic or aromatic diisocyanate with a polymer containing terminal groups reactive with the diisocyanates;

B) Compositions wherein the thermoplastic polymer incompatible with starch is a polyester comprising repeating units deriving from an aliphatic dicarboxylic acid and/or from a hydroxyacid with more than 2 carbon atoms and wherein the ratio R between the average viscosimetric molecular weight and the melt index of the polyester (measured at 180° C. under a load of 5 kg) is greater than 25,000;

C) Compositions wherein the thermoplastic polymer with starch is a copolyester selected from the aliphatic-aromatic copolyesters, polyester-amides, polyester-ethers, polyester-ether-amides, polyester-ureas, and polyester-urethanes, said compositions being obtained by extrusion of the components under conditions wherein the content of water during the extrusion mixing is maintained from 1 to 5% by weight as measured at the exit of the extruder, prior to conditioning.

The HLB index of the ester a)–c) of the A) compositions is given by the ratio between the molecular mass of the hydrophilic fraction of the molecule (Mh) and the total molecular mass (M) multiplied by 20: HLB=20×(Mh/M).

In the case of monoglycerides, the empirical formula normally adopted is the following:

HLB=20 (1−S/A) in which S is the saponification number of the ester and A is the acidity number of the acid.

The hydrophilic/lipophilic balance of the esters is controlled by the length of the acid chain and by the number of hydroxyl groups which remain free after esterification.

The effect of the esters in bringing about compatibility in the case of starch/polyester systems is due to the interaction between the free alcohol groups of the ester and those of the starch and between the ester groups of the ester which brings about compatibility, and the polyester phase.

The esters of class a) are soluble in water; their effectiveness varies in dependence on the pK value of the acid and generally increases as the pK value decreases.

The best results are achieved with the esters of oxalic acid (pK=1.23), maleic acid (pK1=1.83), malonic acid (pK1—2.83), and mono-, di- and tri-chloroacetic acids (pK 2.83, 1.48 and 0.70, respectively).

Mono- and di-esters of polyols containing 3 or more alcohol groups are preferred; mono- and di-glycerides, particularly of oxalic acid, are particularly preferred. Mono- and di-esters of sorbitol, trimethylol propane, pentaerythritol and similar polyols are also examples of compounds which can advantageously be used.

The esterification of the hydroxyl groups of the polyol is generally partial, affecting between 10 and 90% of the hydroxyl groups, preferably between 20 and 70%, and most preferably between 25 and 50%.

The partial esterification condition applies both to the esters a) and to the esters b) and c).

The esters a) are generally used in a ratio to the starch of from 1:30 to 1:2.5 by weight.

The quantities of the esters a) used are preferably from 5–40% relative to the starch, or from 0.5 to 20% by weight relative to the total composition. However, the compatibility effect starts to appear even at levels of 1–3% of the total weight of the composition.

The esters are generally used to replace 30–35% of the plasticizer; however, they may also be used without plasticizers.

The HLB values of some monoglycerides of class a) and the pK1 and pK2 constants of the corresponding acids are given by way of illustration:

| Acid | pK1 | pK2 | HLB of the ester |
| --- | --- | --- | --- |
| Oxalic | 1.23 | 4.19 | 12.4 |
| Malonic | 2.83 | 5.69 | 11.7 |
| Succinic | 4.16 | 5.61 | 11.1 |
| Adipic | 4.43 | 4.41 | 9.9 |
| Pivalic | 4.78 | — | 8.4 |

The effect of the esters of type a) in bringing about compatibility is such as to achieve a fine microstructure of the starch with a mean particle size at least one order of magnitude smaller than that of the particles of the compositions prepared, even in very favourable rheological conditions, in the absence of type a) agents for bringing about compatibility.

The average numeral size of the starch particles is between 0.1 and 0.5 microns and more than 80% of the particles have a size of less than 1 micron.

The water content of the compositions during the mixing of the components is preferably kept between 1 and 15% by weight.

It is, however, also possible to operate with a content of less than 10 by weight, in this case, starting with pre-dried and pre-plasticized starch.

The fine microstructure of the starch permits the production of a film which still retains good tensile and tear-strength properties after washing with water in order to remove the plasticizers. In these films, the small dimensions of the starch particles no longer enable tearing to be initiated.

The esters of classes b) and c) are insoluble in water and are therefore not removed by washing.

Unlike the esters which are soluble in water and which, as well as acting as interfacial agents, also have a fairly good plasticizing effect, the insoluble esters, by virtue of the size of their hydrophobic aliphatic components, act mainly as interfacial agents, facilitating the slippage of the surfaces during stressing, thus minimizing the capacity of the particles, which have become rigid and no longer deformable as a result of loss of plasticizer, to initiate tearing.

Examples of esters of class b) are monoglycerides of caproic acid (pK=4.85; HLB=7.3), of suberic acid (pK1=4.52 and HLB=6) and of azelaic acid (pK1=4.55 and HLB=5.8).

Esters of caproic acid, particularly monoglycerides (HLB=7.3), are preferred since they can maintain a high tear strength of the films without detracting from their quality.

Esters b) are generally used in a ratio to the starch of from 1:30 to 1:2.5 or from 0.5 to 20% by weight relative to the total composition.

Examples of esters of class c) are monoglycerides of lauric acid (HLB 5.4) and of oleic acid (HLB=4.2). Examples of other monoglycerides which can be used are those of myristic, palmitic, stearic, erucic and linoleic acids.

The esters of class c), since materials of these types act as interfacial agents and not as lubricants, are used in high concentrations in comparison with those of the lubricants used in the prior art, that is, in concentrations of from 3 to 10%, preferably from 5 to 10% by weight, which is equal to about 10–40% by weight relative to the starch.

Examples of non-ionic surfactants of class d) are alkoxylated alkylphenols with HLB indices greater than 10, such as nonylphenol ethoxylate, with the degree of ethoxylation regulated in a manner such that the HLB is greater than 10.

The alkoxylated alkylphenols are used in concentrations within a fairly narrow range, generally of from 3–7% of the weight of the composition. Concentrations outside this critical range have no effect. Other examples of surfactants of class d) are the ethoxylation products of sorbitol, starch, fatty acids, rosinic acid, tall oil, amides of fatty acids and ethanolamides.

The acids usable in the preparation of the esters a) to c) comprise saturated and unsaturated, linear or branched aliphatic and aromatic, mono- to polycarboxylic acids, possibly containing substituents selected, for example, from halogen atoms, hydroxyl groups, alkoxyl groups, nitro groups, and ester groups, for example, acetyl citric acid.

Representative acids are:

formic acid, mono-, di- and tri-chloroacetic acid, propionic acid, butyric and isobutyric acids, amylic acid, isoamylic acid, pivalic acid and caproic acid, and fatty acids from lauric acid to docosanoic acid;

di-carboxylic acids such as oxalic, malonic, succinic, glutaric, adipic, suberic and azelaic acids;

hydroxy-acids such as glycolic, glyceric, lactic, citric, tartaric, malic, and benzoic acids, substituted benzoic acid and salicylic acid.

The interfacial agents of class e) are preferably obtained by reaction of a diisocyanate such as hexamethylenediisocyanate with an aliphatic-aromatic polyester, such as poly-epsilon-caprolactone. The agents e) are used in the amount of 1 to 10 by weight of the composition.

The polyols used for the preparation of esters a) to c) contain 3 or more carbon atoms and 2 or more alcohol groups, for example, glycerol, di- and polyglycerols, ethylene or propylene glycol, ethylene or propylene diglycol, polyethylene glycol, polypropylene glycol, 1,2-propandiol, trimethylol ethane, trimethylol propane, pentaerythritol, sorbitol, erythritol, xylitol, sucrose, 1,3-propandiol, 1,2-, 1,3-, 1,4-butandiol, 1,5-pentandiol, 1,6-, 1,5-hexandiol, 1,2,6-, 1,3,5-hexantriol, neopentyl glycol, and polyvinyl alcohol prepolymers.

These polyols as such or esterified with acids other than those used in the esters of classes a) and b) constitute an effective class of plasticizers usable in the compositions of the invention.

Polyols usable as plasticizers, in addition to those indicated above, comprise polyol acetates, ethoxylates and propoxylates, particularly sorbitol ethoxylate, glycerol ethoxylate, sorbitol acetate, and pentaerythritol acetate.

These and other polyols which may be used are described in U.S. Pat. No. 5,292,782.

The quantities of plasticizers used are generally from 1 to 100%, preferably from 10–30% by weight, relative to the starch.

The thermoplastic polymers incompatible with starch usable in the A) type compositions of the invention are preferably selected from following groups of polymers:

a) aliphatic polyesters obtained by polycondensation of hydroxy-acids with 2 or more carbon atoms or of the corresponding lactones or lactides. Examples of these polyesters and their derivatives are described in U.S. Pat. No. 5,412,005; polycaprolactones, hydroxy-butyric and hydroxyvaleric polymers and copolymers, polyalkylene tartrate, and glycolic and lactic acid polymers and copolymers are preferred;

b) aliphatic polyesters obtained by polycondensation of diols with 2–10 carbon atoms with aliphatic dicarboxylic acids; polyalkylene succinate, polyalkylene adipate are preferred;

c) aliphatic polycarbonates such as polyethylene carbonate and polypropylene carbonate, polyester-carbonates, polyamides-carbonates, polyesters amides-carbonates;

d) esters of cellulose such as cellulose acetate, cellulose propionate, cellulose butyrate and mixed esters thereof;

e) esters of starch such as starch acetate, propionate, and butyrate and starches esterified with acids up to C18; the degree of substitution of the starch is between 0.5 and 3;

f) carboxymethyl cellulose, alkyl ethers and hydroxyalkyl ethers of cellulose, polysaccharides, chitin and chitosan, alginic acid and alginates;

g) vinyl esters and copolyesters both as such and partially hydrolyzed, such as polyvinyl acetate, polyvinyl acetate-/polyvinyl alcohol up to 50% hydrolysis, polyethylenevinyl acetate, polyethylene-acrylic acid and mixtures of polymers from a) to g).

The polyesters, particularly those obtained from hydroxy-acids, may be modified to form block copolymers or graft copolymers with polymers or copolymers which can react with the carboxyl and/or hydroxyl groups present in the polyesters.

The polymers and copolymers listed may be upgraded with chain extenders such as di- or polyisocynates, di- or polyepoxides, or with polyfunctional compounds such as pyromellitic acid, pyromellitic anhydride.

The homopolymers and copolymers of epsilon-hydroxy-acids, particularly 6-hydroxy-caproic acid and the corresponding lactone are preferred.

The polyesters and their derivatives generally have melting points of between 40° and 175° C. and molecular weights (weighted average) greater than 20000, preferably greater than 40000.

The polyesters and their derivatives can advantageously be used in mixtures with one or more polymers or copolymers obtained from ethylenically unsatured monomers containing polar groups, preferably hydroxyl and carboxyl groups, such as ethylene/vinyl acetate, ethylene/vinyl alcohol and polyvinyl alcohol copolymers (the latter obtained by hydrolysis of polyvinyl acetate and ethylene vinyl acetate copolymers with degrees of hydrolysis of from 50 to 100%) and ethylene/acrylic acid copolymers.

The ethylene/vinyl alcohol copolymers preferably contain from 10 to 50% by weight of ethylene.

The alcohol groups of the polymers mentioned above may be converted into ether, ester, acetal or ketal groups.

Preferred mixtures contain poly-epsilon-caprolactone and ethylene/vinyl alcohol or ethylene/vinyl acetate or polyvinyl alcohol copolymers.

The ratio by weight between the polyesters and the polymers or copolymers containing alcohol groups is preferably between 1:30 and 30:1, more preferably between 1:15 and 15:1 and even more preferably between 1:6 and 6:1.

The ratio by weight between thermoplastic starch and e)–g) polymer is generally between 1:20 and 20:1 and preferably from 1:10 to 10:1, more preferably from 1:4 to 4:1 and is selected in a manner such that the polyester constitutes the continuous phase and the starch the dispersed phase.

Other preferred mixtures, used particularly in injection moulding, contain cellulose or starch esters with a degree of substitution of between 1 and 3, particularly cellulose acetate and starch acetate.

The thermoplastic starch present in the compositions is obtained from native starch extracted from vegetables such as potatoes, rice, tapioca, maize and/or from chemically or physically modified starch.

The compositions of the invention may include quantities of from 0.5 to 20% by weight of urea or hydroxides of alkaline-earth metals, between 0.1 and 5% of inorganic salts of alkali-metals or alkaline-earth metals, particularly LiCl, NaCl, $Na_2SO_4$, and also compounds containing boron, particularly boric acid, proteins and salts of proteins such as casein, gluten, caseinates, etc., abietic acid and derivatives thereof, rosinic acids, and natural gums.

Other hydrophobic polymers such as polyethylene, polypropylene and polystyrene and additives such as antioxidants, lubricants, flame-proofing agents, fungicides, herbicides, fertilizers and opacifiers, compounds with rodent-repellent effects, waxes and lubricants may be present.

The compositions are preferably prepared by mixing the components in an extruder heated to a temperature of between 100° and 220° C.

Instead of an extruder, the components may be mixed in any apparatus which can ensure temperature and shear stress conditions appropriate for the viscosity values of the thermoplastic starch and of the polymer incompatible with starch.

The starch may be treated to render it thermoplastic before being mixed with the other components of the composition or during the mixing of the components of the composition.

In both cases, known methods are used, with operating temperatures of between about 100° and 220° C., in the presence of plasticizers and possibly water.

The water content at the output of the extruder (that is, before any conditioning treatments) is preferably less than 5% by weight.

The content is regulated by degassing during extrusion or with the use of dehydrated starch with a low water content.

The compositions of the invention are usable particularly in the preparation of films, sheets, fibres, in injection-moulding, thermoforming, coextrusion, and in the preparation of expanded materials.

Fields of use of particular interest are those of nappies and sanitary towels, of films for agriculture particularly for mulching, of bags, of films for cellophaning, of disposable articles, of expanded packaging elements, and of articles for nurserymen.

The films may be used in laminates with layers formed by polyesters, polyester-amides, polyamides, aliphatic polycarbonates, aromatic/aliphatic polycarbonates, soluble polymers such as polyvinyl alcohol or other polymers, with paper, and with layers of inorganic materials such as silica, aluminium, etc.

The compositions may be supplemented with fillers, preferably of natural origin, and with natural or modified resins such as abietic acid.

The compositions of group B) contain as peculiar components a polyester having a R ratio greater than 25,000 and preferably greater than 35.000 and more preferably comprised between 35,000 and 110,000. Polyesters with R ratios greater than 25,000 are preferably obtained by upgrading reaction, in the melt, of a polyester with a R ratio below 25,000 with a bi- or polyfunctional compound having groups which are reactive with terminal OH and/or COOH groups of the polyester. The quantity of the polyfunctional compound used is at least equivalent to the number of reactive groups of the polyester. The reaction is carried out until the desired reduction of the melt index is achieved.

Representative polyfunctional compounds are di- and poly-isocyanates, epoxides and poly-epoxides, and the dianhydrides of tetracarboxylic acids.

Preferred compounds are di-isocyanates such as hexamethylene diisocyanate, dianhydrides of aromatic tetracarboxylic acids, and poly-epoxides.

The upgrading of the polyester can be obtained by extruding the polyester in the presence of the upgrading agent.

It is also possible to prepare polyesters having the desired melt-index and molecular-weight characteristics directly by polycondensation, as long as the viscosity values of the melt are not too high.

The polyesters usable for the preparation of the compositions of the invention are obtained from aliphatic polyesters comprising, in the chain, repeating units derived from an aliphatic dicarboxylic acid or from a hydroxy-acid with more than two carbon atoms.

The polyester are preferably selected from the same a) and b) groups of polyesters set forth for the A) type compositions.

The polyesters, particularly those obtained from hydroxy-acids, may be modified to form block copolymers or graft copolymers with polymers or copolymers which can react with the carboxyl and/or hydroxyl groups present in the polyesters.

The homopolymers and copolymers of epsilon-hydroxy-acids, particularly 6-hydroxy-caproic acid and the corresponding lactone are preferred. The polycaprolactone preferably has a mean viscosimetric molecular weight greater than 100,000 and R-ratio values preferably of between 35,000 and 110,000.

The polyesters and their derivatives generally have melting points of between 40° and 175° C. and molecular weights (viscosimetric mean) greater than 20,000, preferably greater than 40,000.

The polyesters and their derivatives can advantageously be used in mixtures with one or more polymers or copolymers obtained from ethylenically unsaturated monomers, containing polar groups, preferably hydroxyl and carboxyl groups, such as ethylene/vinyl acetate, ethylene/vinyl alcohol and polyvinyl alcohol copolymers (the latter obtained by hydrolysis of polyvinyl acetate and ethylene vinyl acetate copolymers with degrees of hydrolysis of from 50 to 100%) and ethylene/acrylic acid copolymers.

The ethylene/vinyl alcohol copolymers preferably contain from 10 to 50% by weight of ethylene.

The alcohol groups of the polymers mentioned above may be converted into ether, ester, acetal or ketal groups.

Preferred mixtures contain poly-epsilon-caprolactone and ethylene/vinyl alcohol or ethylene/vinyl acetate copolymers.

The ratio by weight between the polyesters and the polymers or copolymers containing alcohol groups is preferably between 1:6 and 6:1, more preferably between 1:4 and 4:1.

The ratio by weight between thermoplastic starch and polyester is generally between 1:10 and 10:1 and is selected in a manner such that the polyester constitutes the continuous phase and the starch the dispersed phase.

The compositions of the invention preferably comprise a plasticizer generally selected from polyols containing 3 or more carbon atoms and 2 or more alcohol groups such as glycerol, di- and polyglycerols, ethylene or propylene glycol, ethylene or propylene diglycol, polyethylene glycol, polypropylene glycol, 1,2-propandiol, trimethyl propane, pentaerythritol, sorbitol, erythritol, xylitol, sucrose, 1,3-propandiol, 1,2-, 1,3-, 1,4-butandiol, 1,5-pentandiol, 1,6-, 1,5-hexandiol, 1,2,6,-, 1,3,5-hexantriol, neopentyl glycol.

The polyols indicated above may be used in the form of etherification or esterification products, such as polyol acetates, ethoxylates and propoxylates, particularly sorbitol ethoxylate, glycerol ethoxylate, sorbitol acetate, and pentaerythritol acetate.

The quantities of plasticizers used are generally from 1 to 100%, preferably from 10–30% by weight, relative to the starch.

The use of plasticizers of this type is described in U.S. Pat. No. 5,292,782, the description of which is incorporated herein, by reference.

The compositions may also comprise the interfacial agents described for the A) compositions. In this case, the use of the interfacial agent further improves the rheological characteristics of the compositions.

The thermoplastic starch present in the composition is obtained from native starch extracted from vegetables such as potatoes, rice, tapioca, maize and/or from chemically or physically modified starch.

The compositions of the invention may include quantities of from 0.5 to 20% by weight of urea or hydroxides of alkaline-earth metals, between 0.1 and 5% of inorganic salts of alkali-metals or alkaline-earth metals, particularly LiCl, NaCl, $Na_2SO_4$, and also compounds containing boron, particularly boric acid, proteins such as casein, gluten, salts of proteins, abietic acid and derivatives thereof, rosinic acids, and natural gums.

Other hydrophobic polymers such as polyethylene, polypropylene and polystyrene and additives such as antioxidants, lubricants, flame-proofing agents, fungicides, herbicides, fertilizers and opacifiers, compounds with rodent-repellent effects, and waxes may be present.

The compositions are preferably prepared by mixing the components in an extruder heated to a temperature of between 100° and 220° C.

Instead of an extruder, the components may be mixed in any apparatus which can ensure temperature and shear-strain conditions corresponding to the viscosity values of the thermoplastic starch and of the polymer incompatible with starch.

The starch may be treated to render it thermoplastic before being mixed with the other components of the composition or during the mixing of the components of the composition.

In both cases, known methods are used, with operating temperatures of between about 100° and 220° C., in the presence of plasticizers and possibly water.

The water content at the output of the extruder (that is, before any conditioning treatments) is preferably less than 5% by weight, and may be almost zero.

The content is regulated by degassing during extrusion or with the use of dehydrated starch with a low water content.

The use of polyesters having the molecular-weight and melt-index characteristics indicated above, possibly in combination with the agents with interfacial effect and a) and e) type used in A) compositions, gives rise to compositions which have a fine microstructure of the dispersed phase in which more than 80% of the particles have dimensions of less than 1 micron and the numeral average particle size is between 0.1 and 1 micron.

The B) compositions, similarly to the A) compositions, are usable particularly in the preparation of films, sheets, fibres, in injection-moulding, thermoforming, coextrusion, and in the preparation of expanded materials.

Fields of use of particular interest are those of nappies and sanitary towels, of films for agriculture, of bags, of films for cellophaning, of disposable articles, and of expanded packaging elements.

The films may be used in laminates with layers formed by polyesters, polyester-amides, polyamides, aliphatic polycarbonates, aromatic/aliphatic polycarbonates, soluble polymers such as polyvinyl alcohol or other polymers, with paper, or with layers of inorganic materials such as silica, aluminium, etc.

The compositions may be supplemented with fillers, preferably of natural origin, and with natural or modified resins such as abietic acid.

The C) compositions are characterised in that they comprise a polyester selected from the group consisting of aliphatic aromatic copolyesters, polyester-amides, polyester-ethers, polyester-ether-amides, polyester-urethanes and polyester-ureas, and in that they are obtained by extrusion under conditions wherein the content of water is maintained higher than 1% up to 5% by weight during the mixing of the components (content measured at the exit of the extruder i.e. prior to any conditioning treatment).

From the state of the art, particularly from WO93/07213 with describes compositions comprising starch and a copolyester obtained from mixtures of a terephthalic acid and adipic or glutaric acid and from an aliphatic diol, wherein the components are accurately dried, before being mixed, to a water content less than 1 wt. and from WO96/31561 which describes compositions comprising starch and copolyesters such as aliphatic-aromatic copolyesters, polyester-amides and polyester-urethanes, wherein starch is a plasticized product dried to a content of water less than 1% wt. or the copolyester-starch mixture is blended in the extruder under conditions to maintain the water content less than 1% wt, the expected result of mixing in the melt at high temperatures and in the presence of water at a level higher than 1% by weight a copolyester of the type above mentioned was a remarkable hydrolysis and degradation of the copolyester with consequent impairment of the properties of the final product.

Contrary to the expectations, it has been found that operating under the conditions used to prepare the compositions C), the decrease of the molecular weight of the polyester is negligible.

It has further been found that, if the compatibilisation conditions during the mixing with extruder are good enough to obtain a dispersion of starch in form of particles having an average size less than 1 micron, preferably less than 0,5 micron, the resulting compositions present properties similar to those of polyethylene and which remain practically unchanged under relative low humidity conditions.

Another aspect which is characteristic of the compositions C) resides in that by extruding the compositions under the above specified humidity conditions i.e. a water content from 1 to 5% wt. it is possible to obtain products endowed with a microstructure finer than that obtainable by extruding, all the other conditions being the same, compositions wherein the polymeric hydrophobic component is a polyester totally aliphatic in its structure.

With the compositions C), the use of an interfacial agent as specified for the compositions A) and of a polymer with a molecular wight and melt index modified as set forth for the compositions B) is an optional condition.

When the interfacial agent and/or the modified polymer is used, the rheological properties of the compositions are further improved.

The aliphatic-aromatic copolyesters preferably are of the random type. Block copolymers can also be used.

The copolyesters are obtained by polycondensation, according to known methods, of mixtures of an aliphatic dicarboxilic acids such as adipic sebacic, succinic, azelaic or glutaric acids and/or a hydroxy acid with more than 2 carbon atoms or the corresponding lactone with an aromatic dicarboxilic acid such as terephthalic and isophthalic acids with a diol with 1–20 carbon atoms, such as 1,2-ethanediol, 1,3-propandiol, 1,4-butandiol, 1,4-cyclohexandimethylol.

The copolyesters have in general formula:

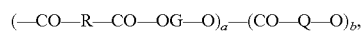

wherein up to about 40% by mols of R is a bivalent non-aromatic radical $C_1$–$C_{12}$ and the remaining of R is a p-phenlene radical; G is up to 30% by mols a radical selected from —$(CH_2)_2$—O—$(CH_2)_2$, —$(CH_2)_2$—O—$(CH_2)_2$—O—$(CH_2)_2$ the remaining of G being an ether-polyalkylenic radical with molecular weight higher than 250 or a radical $(CH_2)_2$—O—$(CH_2)_4$; Q derives from a hydroxyacid with more than 2 carbon atoms; a) and b) are molar fractions of the polymer with a) being comprised from 0.6 and 1 and b) from 0 to 0,4.

Copolyesters of the above type are described in U.S. Pat. No. 5,446,079 and WO 93/07123 which are herein incorporated by reference.

The polyester-amides have in general a structure deriving for 30–70% by weight from an aromatic or aliphatic-aromatic ester and from 70–30% from an aliphatic amide.

Examples of polyester-amides are poly-epsilon-caprolactone-epsilon-caprolactam, poly-alkylenadipate-epsilon-caprolactam.

Examples of usable polyester-amides are described in EP-A-641817 and in WO96/21689, WO-96/21690, WO-96/21691 and WO-96/21692, the description of which is herewith incorporated by reference.

The polyester-ether copolymers can be obtained from an aromatic dicarboxylic acid such as terephthalic acid and a polyalkylenoxide.

The polyester-urethane and polyester-urea copolymers can be obtained according to known methods; for instance the polyester-urethanes from a dicarboxilic acids such as terephthalic acid and an aliphatic diisocianate.

The compositions C) comprise from 20 to 95% by weight of starch and 5–80% by weight of copolyester. Preferably the content of starch is from 30 to 75% by weight.

The copolyesters can be used in mixtures with the polymers and copolymers containing polar groups as specified for the compositions A) and B).

The weight ratio between the copolyester and the (CO) polymer containing polar groups is the same as specified for A) and B) compositions.

The thermoplastic starch present in the compositions is obtained from native starch or chemically or physically modified starch as described for the compositions B). The compositions preferably contain a plasticizer of the type as specified in the compositions A) and B) with amounts therein disclosed.

The compositions may contain additives as set forth for the compositions A) and B).

The composition are prepared by extrusion of the components under conditions that the content of water during the mixing stage is maintained, by degassing, at values from 1 to 5% by weight.

The content of water of the native starch can be comprised from 1 to 16% by weight.

The extrusion conditions (temperature which can range from 100° to 220° C. and shearing forces) are selected as to obtain a good compatibilisation between starch and the incompatible copolyester.

The starch may be treated to render it thermoplastic according to the known method e.g. operating in the presence of plasticizers and water, before being mixed with the components of the composition or during the mixing.

The compositions are useful for the same applications, as disclosed for the compositions A) and B).

Thanks to the rather high melting point of the copolyester used in the compositions C), the same are particularly usable in applications wherein a food thermal resistance is required.

The following examples 1–45 (examples 1, 42 and 44 are comparison examples) are provided by way of non-limiting illustration of A) compositions of the invention, examples 1A–6A and comparative examples 1A–2A by way of non-limiting illustration of B) compositions; and examples 1B and 2B of C)-compositions.

The esters used in the examples 1–45 were prepared in accordance with conventional methods. In the case of the stronger carboxylic acids, the use of acid catalysts was not necessary but it sufficed to remove the water produced by the reaction. For the weaker acids, particularly the fatty acids, the reaction was catalyzed with small amounts of toluene sulphonic acid.

Since the esterification did not affect all of the hydroxyl groups of the polyol (so that both ester functions and alcohol functions were present simultaneously in the reaction product) but only a fraction of between 10 and 90% of the hydroxyl groups, preferably between 20 and 70%, and more preferably between 25 and 50%, it was possible to continue the reaction until the acid was used up. Any traces of unreacted acid could be neutralized with organic or inorganic bases, preferably triethanolamine.

The product of these partial esterifications was constituted predominantly by the polyol with the desired degree of esterification; the second largest fraction was constituted by unsubstituted polyol, and the remainder was constituted by polyol with higher degrees of substitution or, in the case of dicarboxylic acids, by oligomeric forms.

The inherent viscosity given in the examples 1A–6A is expressed by the equation:

$$[\eta]inh = \frac{[\eta]t/t^°}{c}$$

where:

$t^°$=time taken by a known volume of pure solvent to pass through the capillary of the viscosimeter;

t=time taken by an identical volume of the solution containing the polymer to pass through the capillary, c=concentration of the polymer in the solution, expressed in g/dl.

The instrument used for the measurements was a Bischoff viscosimeter.

The measurement was carried out in tetrahydrofuran at 25° with the use of 1 g of polymer in 100 ml of solvent.

In the following examples all "parts" are intended by weight, unless otherwise stated.

EXAMPLE 1 (COMPARISON)

A composition containing 55 parts of PCL TONE 787 (Union Carbide), 31 parts of Globe maize starch 03401 (Cerestar), 0.25 parts of erucamide, 12 parts of glycerol, and 1.75 parts of water was mixed in an OMC single-screw extruder D=20 mm and L/D=30 with an operating temperature profile of 80/180/150/130° C. at 70 rpm.

The pellets obtained were then supplied to a Haake single-screw extruder, D=19 mm and L/D=20, with a film-forming head.

The heating profile during the blow-moulding was 115/120/125/130° C. at 30 rpm.

The film obtained constituted the reference material.

EXAMPLES 2–40

The compositions given in the following table were mixed and filmed with the use of the method of Example 1 and with the PCL, starch, water and erucamide parts remaining the same but with all or some of the glycerol replaced by the esters indicated below:

TABLE 1

| Example | 2 | 3 | 4 | 5 | 6 | 7 | 8 | 9 | 10 | 11 | 12 | 13 | 14 |
|---|---|---|---|---|---|---|---|---|---|---|---|---|---|
| glycerol | 9 | 9 | 9 | 6 | 9 | 6 | 5 | 5 | 5 | 6 | 6 | 6 | 11 |
| chloro-acetate | 3 | | | | | | | | | | | | |
| tri-chloro-acetate | | 3 | | | | | | | | | | | |
| pivalate | | | 3 | 6 | | | 2 | 3 | | | | | |
| caproate | | | | | 3 | 6 | 5 | 4 | | | | | |
| 1,5 caproate | | | | | | | | | 6 | | | | |
| laurate | | | | | | | | | | 6 | | | |
| S-oleate | | | | | | | | | | | 3 | | |
| S-oleate | | | | | | | | | | | | 6 | |
| oxalate | | | | | | | | | | | | | 1 |

| Example | 15 | 16 | 17 | 18 | 19 | 20 | 21 | 22 | 23 | 24 | 25 | 26 | 27 |
|---|---|---|---|---|---|---|---|---|---|---|---|---|---|
| glycerol | 9 | 7 | — | 4 | 2 | 9 | 6 | 9 | 9 | — | 6 | 9 | 6 |
| sorbilene | | | | 4 | 4 | | | | | | | | |
| oxalate | | 3 | 5 | 12 | 4 | 6 | | | | | 1 | | |

TABLE 1-continued

| | | | | | | | | | | | | | |
|---|---|---|---|---|---|---|---|---|---|---|---|---|---|
| S-oxalate | | | | | 3 | 6 | | | | | | | |
| TMP-oxalate | | | | | | | 3 | | | | | | |
| EG-oxalate | | | | | | | | 3 | 12 | | | | |
| caproate | | | | | | | | | | 5 | | | |
| malonate | | | | | | | | | | | 3 | 6 | |

| Example | 28 | 29 | 30 | 31 | 32 | 33 | 34 | 35 | 36 | 37 | 38 | 39 | 40 |
|---|---|---|---|---|---|---|---|---|---|---|---|---|---|
| glycerol | — | 9 | 9 | — | 9 | 5 | 7 | 9 | 9 | 6 | 6 | 9 | 6 |
| malonate | 12 | | | | | | | | | | | | |
| maleate | | 3 | | | | | | | | | | | |
| succinate | | | 3 | 12 | | | | | | | | | |
| adipate | | | | | 3 | | | | | | | | |
| azelate | | | | | | | 7 | | | | | | |
| suberate | | | | | | | 7 | | | | | | |
| acetyl citrate | | | | | | 3 | | | | | | | |
| oleate | | | | | | | | 3 | 6 | | | | |
| nonylphenol 10 | | | | | | | | | | 6 | | | |
| nonylphenol 19 | | | | | | | | | | | | 3 | 6 |

Note

Glycerol and sorbilene are polyols used as plasticizers; sorbilene is a sorbitol monoethoxylate.

Unless expressly indicated, the ester was obtained by the reaction of a COOH function with one mole of glycerol.

caproate 1,5 resulted from the reaction of 1.5 moles of caproic acid per mole of glycerol S-oleate was monosorbitane oleate S-oxalate was produced from one mole of oxalic acid and two moles of sorbitol TMP-oxalate was produced from one mole of oxalic acid and two moles of trimethylol propane EG-oxalate was produced from one mole of oxalic acid and two moles of ethylene glycol nonylphenol 10 was nonylphenol ethoxylate with 10 moles of ethylene oxide; HLB=13 nonylphenol 19 was nonylphenol ethoxylate with 19 moles of ethylene oxide; HLB=16

Evaluation of the Material Samples

The films were conditioned at 20° C. and 15' RH for 48 hours and were then subjected to preliminary tear-strength screening. The evaluation was carried out manually and the appraisal was as follows:

| Example | very good | good | poor | very poor |
|---|---|---|---|---|
| 1 | | | | x |
| 2 | x | | | |
| 3 | x | | | |
| 4 | | | x | |
| 5 | | x | | |
| 6 | | | x | |
| 7 | | x | | |
| 8 | | x | | |
| 9 | | x | | |
| 10 | | x | | |
| 11 | | x | | |
| 12 | | x | | |
| 13 | | x | | |
| 14 | x | | | |
| 15 | x | | | |
| 16 | x | | | |
| 17 | x | | | |
| 18 | x | | | |
| 19 | x | | | |
| 20 | x | | | |
| 21 | x | | | |
| 22 | x | | | |
| 23 | x | | | |
| 24 | x | | | |
| 25 | x | | | |
| 26 | | x | | |
| 27 | x | | | |
| 28 | x | | | |
| 29 | | | x | |
| 30 | | x | | |
| 31 | x | | | |
| 32 | | x | | |
| 33 | | x | | |
| 34 | | x | | |
| 35 | | | x | |
| 36 | | | x | |
| 37 | | x | | |
| 38 | | x | | |
| 39 | | | x | |
| 40 | | x | | |

Paper Contact Test

The formulations which gave good or very good responses in the preliminary screening were tested in terms of tear strength after the corresponding films had been placed between sheets of pure cellulose paper at 50° C. and RH<10% for two months.

In this case, preliminary manual screening was again carried out.

The test was quite severe since the paper was able to take plasticizers such as glycerol from the films.

The results were as follows:

| Example | very good | good | poor | very poor |
|---|---|---|---|---|
| 1 | | | | x |
| 2 | | x | | |
| 3 | | x | | |
| 5 | | x | | |
| 7 | | x | | |
| 8 | | x | | |
| 9 | | x | | |
| 10 | | x | | |
| 11 | | x | | |
| 12 | | x | | |
| 13 | | x | | |
| 14 | | x | | |
| 15 | x | | | |
| 16 | x | | | |
| 17 | x | | | |
| 18 | x | | | |
| 19 | x | | | |
| 20 | | x | | |
| 21 | | x | | |
| 22 | | x | | |
| 23 | | x | | |
| 24 | x | | | |
| 25 | | x | | |
| 26 | | x | | |
| 27 | x | | | |
| 28 | x | | | |
| 30 | | x | | |
| 31 | x | | | |
| 32 | | x | | |
| 33 | | x | | |
| 34 | | x | | |

-continued

| Example | very good | good | poor | very poor |
|---|---|---|---|---|
| 37 | | x | | |
| 38 | | x | | |
| 40 | | x | | |

Tear Strength after the Films Had Been Washed in Water

This was the most severe test since the conventional plasticizers (glycerol and sorbilene in this case) as well as the water-soluble esters were completely removed.

In practice, the film was immersed in distilled water for 24 hours, after which it was left to dry for 25 hours at ambient temperature.

The films which were good or very good in the paper contact test were subjected to this test; evaluation was again manual.

| Example | very good | good | poor | very poor |
|---|---|---|---|---|
| 1 | | | | x |
| 2 | | x | | |
| 3 | | x | | |
| 5 | | x | | |
| 7 | | x | | |
| 8 | | x | | |
| 9 | | x | | |
| 10 | | | x | |
| 11 | | | x | |
| 12 | | | x | |
| 13 | | | x | |
| 14 | | | x | |
| 15 | | x | | |
| 16 | x | | | |
| 17 | x | | | |
| 18 | x | | | |
| 19 | x | | | |
| 20 | | x | | |
| 21 | x | | | |
| 22 | | | x | |
| 23 | | | x | |
| 24 | x | | | |
| 25 | | x | | |
| 26 | | | x | |
| 27 | | x | | |
| 28 | x | | | |
| 30 | | | x | |
| 31 | | | x | |
| 33 | | | x | |
| 34 | | | x | |
| 37 | | x | | |
| 38 | | x | | |
| 40 | | x | | |

Mechanical Properties

The mechanical properties of some films subjected to washing with water are given in comparison with the untreated films.

| Example No. | Sigma b MPa | Ext.* % | Modulus MPa | Breaking energy KJ/m² |
|---|---|---|---|---|
| 1 untr. | 33 | 849 | 200 | 6837 |
| 1 washed | 19 | 3 | 1179 | 16 |
| 7 untr. | 12 | 684 | 156 | 3958 |
| 7 washed | 8 | 314 | 752 | 1790 |
| 12 untr. | 22 | 969 | 271 | 6409 |
| 12 washed | 12 | 8 | 751 | 45 |
| 13 untr. | 23 | 946 | 161 | 6340 |
| 13 washed | 11 | 326 | 573 | 1768 |
| 17 untr. | 33 | 923 | 170 | 7515 |
| 17 washed | 19 | 490 | 885 | 4750 |
| 18 untr. | 33 | 849 | 200 | 6837 |
| 18 washed | 19 | 420 | 996 | 4970 |
| 19 untr. | 26 | 741 | 170 | 5042 |
| 19 washed | 17 | 393 | 1007 | 3339 |
| 36 untr. | 25 | 1076 | 156 | 7582 |
| 36 washed | 10 | 9 | 804 | 38 |
| 37 untr. | 23 | 946 | 161 | 6349 |
| 37 washed | 6 | 326 | 546 | 1768 |

*Ext. = elongation at break

EXAMPLE 41

A composition containing 55 parts of PCL Tone 787, 31 parts of Globe maize starch 03401 (Cerestar), 6 parts of oxalic acid monoglyceride, 3 parts of glycerol, and 5 parts of sorbitol monoethoxylate was mixed in an extruder as in Example 1 and then filmed. The film was then subjected to the water washing test. The tensile properties, compared with the same film which had not been washed, were as follows:

| | Sigma b MPa | Ext. % | Modulus MPa | Breaking energy KJ/m² |
|---|---|---|---|---|
| untr. film | 28 | 760 | 234 | 6321 |
| washed film | 23 | 733 | 310 | 5870 |

EXAMPLE 42 (COMPARISON)

A composition containing 44 parts of cellulose acetate with a degree of substitution DS=2.5, 16 parts of diacetin, 32.8 parts of maize starch, 0.2 parts of erucamide and 8 parts of Sorbilene was mixed in a 30 mm APV-2030 XLT extruder with two screws and L/D=35+5. The heating profile was as follows: 60/100/180×14° C. and RPM=170.

The extruded material was pelletized and was pressure moulded at 190° C. to give test pieces 2 mm thick. A test piece was broken cold in order to investigate the fracture surface.

EXAMPLE 43

Using the method of Example 42, a similar composition was prepared but with the Sorbilene replaced by oxalic acid monoglyceride. The material was pressure moulded as in Example 42.

The mechanical properties compared were as follows:

| | | Example 42 | Example 43 |
|---|---|---|---|
| Sigma b | MPa | 22 | 20 |
| Ext. | % | 6.6 | 6.6 |
| Modulus | MPa | 2231 | 2121 |

-continued

|  |  | Example 42 | Example 43 |
|---|---|---|---|
| Breaking energy | KJ/m$^2$ | 67.7 | 69.4 |
| MFI | g/10' | 0.17 | 4.65 |
| Spiral | cm | 557 | 900 |

As can be seen, the use of the ester considerably fluidized the composition in both MFI and spiral terms, for given tensile properties. The effect in bringing about compatibility was even clearer from SEM morphological analysis of the fracture surfaces, from a comparison of which, the material containing the ester was clearly more homogeneous.

MFI was measured at 170° C. with a load of 5 kg.

EXAMPLE 44 (COMPARISON)

A composition exactly the same as that of Example 1 except that the PCL was replaced by a random aliphatic-aromatic copolyester obtained from 60:40 butylene adipate/butylene terephthalate was prepared with the use of the method described in Example 1.

The material was filmed and characterized.

EXAMPLE 45

Example 44 was repeated with the introduction of 5 parts of malonic acid monoglyceride instead of the same quantity of glycerol.

The material was filmed and characterized.

The tensile properties compared were as follows:

|  |  | Example 44 | Example 45 |
|---|---|---|---|
| Sigma b | MPa | 6 | 22 |
| Ext. | % | 408 | 788 |
| Modulus | MPa | 91 | 79 |
| Breaking energy | KJ/m$^2$ | 1432 | 3780 |

COMPARATIVE EXAMPLE 1A 200 g of epsilon-caprolactone, 3.8 mg of tin octanoate, and 186 mg of 1,4 butandiol were loaded into a 300 ml glass reactor and heated to 180° C. for 24 hours with stirring and in an atmosphere of nitrogen.

The polymer obtained has the following characteristics:

| Inherent viscosity | 1.42 dl/g |
|---|---|
| MW (viscosimetric) | 125000 |
| MI | 5.0 |

EXAMPLE 1A

Comparative example 1A was repeated but with 105 mg of 1,4 butandiol instead of 186 mg.

The polymer obtained had the following characteristics:

| Inherent viscosity | 1.75 dl/g |
|---|---|
| MW (viscosimetric) | 183000 |
| MI | 1.8 |

EXAMPLE 2A 253.3 g of Union Carbide PCL Tone 787, dried under vacuum at 50° C. for 24 hours, was placed in a 800 ml glass reactor and heated to 180° C. with stirring (100 RPM).

When the temperature had been reached, 1.0 ml of 1,5 hexamethylene di-isocyanate was added and the reaction was continued for two hours.

The characteristics of the starting PCL and of the reaction product were as follows:

|  | PCL Tone 787 | Example 2A |
|---|---|---|
| Inherent viscosity | 1.28 dl/g | 1.38 dl/g |
| MW (viscosimetric) | 108000 | 121000 |
| MI | 7.0 | 2.5 |

EXAMPLE 3A

A composition containing 99.8 parts of PCL Tone 787, dried as in Example 2A, and 0.4 parts of 1,6-hexamethylene di-isocyanate was supplied to an OMC twin screw extruder, L/D=36 and D=60 mm, operating under the following conditions:

temperature profile: 20/90/90/140/175/190×4/170/150° C.

flow-rate: 10 kg/h

RPM: 150

The extruded and pelletized material had the following characteristics:

| Inherent viscosity | 1.35 dl/h |
|---|---|
| MW (viscosimetric) | 118000 |
| MI | 2.9 |

EXAMPLES 4A–6A, COMPARATIVE EXAMPLE 2A

The following compositions:

| Example | 2A (comp) | 4A | 5A | 6A |
|---|---|---|---|---|
| PCL Example 1A (comp) | 49% | — | — | — |
| PCL Example 1A | — | 49% | — | — |
| PCL Example 2A | — | — | 49% | — |
| PCL Example 3A | — | — | — | 49% |
| Maize starch | 36 | 36 | 36 | 36 |
| Glycerol | 12 | 12 | 12 | 12 |
| Water | 3 | 3 | 3 | 3 | were mixed in an OMC single-screw extruder L/D=30 and D=20 mm operating with a 80/180/150/130 temperature profile at 70 RPM.

The pellets obtained were then supplied to a Haake single-screw extruder, L/D=20 and D=19 mm with a filming head; the temperature profile during the blow-moulding was 115/120/12525/130 and the RPM=30.

The films obtained, which were about 40 microns thick, were characterized from the point of view of their tensile properties and of their tear strength. The measurements were made with test samples conditioned at 50% and 20% RH.

In particular, with regard to the tear strength, measurements were made at both low and high speed; in the first case, an Instron instrument was used with a speed of 250 mm/min, in accordance with ASTM D-1938; in the second case an Elmendorf pendulum was used in accordance with ASTM-1922.

| Example | 2Acomp. | | 4A | | 5A | | 6A | |
|---|---|---|---|---|---|---|---|---|
| Sigma b (MPa) | 10 | 20 | 10 | 18 | 9 | 18 | 10 | 18 |
| Ext. (%) | 830 | 185 | 820 | 530 | 595 | 535 | 605 | 570 |
| Elas. Modulus (MPa) | 205 | 975 | 235 | 780 | 135 | 735 | 170 | 710 |
| Breaking energy (MJ/m$^3$) | 83 | 30 | 91 | 91 | 107 | 116 | 97 | 94 |
| Tear strength 1 (N/mm) | 97 | 83 | 89 | 85 | 87 | 90 | 87 | 85 |
| Tear strength 2 (N/mm) | 200 | 7 | 150 | 150 | 180 | 128 | 170 | 135 |

Tear strength 1 = low speed
Tear strength 2 = high speed

For each example, the data for 50% and 20% relative humidity are given (with 50% in the first column).

EXAMPLE 1B 54 parts of a Eastman Chemical 14766 copolyester (based on terephthalic acid, adipic acid and butandiol), 33.4 parts of maize starch Cerestar Globe 03401, 5.8 parts glycerol and 6.5 parts water were fed to a twin-single screw extruder APV V30 mod. 2030 operating under the following conditions:

standard screws (residence time 80 seconds);
screw diameter: 30 mm
L/D: 10
RPM: 1790
Thermal profile: 60/100/180×14° C.
Active degassing The obtained pellets had water content of 1.18% by weight.

Upon having removed the starch by solubilization with HCl 5 M, the average numerical dimensions of the dispersed starch phase was determined by SEM and was comprised within 0.3 and 0.5 μm.

The intrinsic viscosity of the polyester, recovered by extraction with CHCl$_3$ was:

[η]=0.86 dl/g in CHCl$_3$ at 30° C. against [η]=0,93 dl/g of the starting polymer.

The pellets were subjected to film blowing in a Haake singlescrew extruder, having a diameter of 19 mm, L/D=20 at 140° C., thereby to obtain a film having a thickness of about 45 μm.

The mechanical properties of the obtained films are shown in the following table:

| σy Mpa | εy % | σb Mpa | εb % | Mod Mpa | Energy KJ/m$^2$ |
|---|---|---|---|---|---|
| 5.7 | 9.1 | 7.4 | 478 | 161 | 1566 |

EXAMPLE 2B

Example 1B was repeated by substituting the standard screws by screws including back mixing (reverse) sections. In this case, the residence time in the extruder was raised to 130 seconds.

The pellets were examined according to Example 1B and the following results were obtained:
Water: 1.76% by weight
Particle dimensions comprised within 0.3 and 0.4 μm
Polyester viscosity after blending: [η]=0.83 dl/g The pellets were subjected to film blowing according to Example 1B.

The mechanical properties of the films were the following:

| | σy Mpa | εy % | σb Mpa | εb % | Mod Mpa | Energy KJ/m$^2$ |
|---|---|---|---|---|---|---|
| Film as such | 7.3 | 13.5 | 12.6 | 784 | 154 | 3476 |
| Washed film (*) | 9.0 | 14.6 | 6.7 | 550 | 198 | 2501 |

(*) the plasticizers were removed from the film by emulsion in water for 24 hours The same washed film, conditioned at 23° C. and 20% RH, had a tear strength of 139 KJ/m$^2$ at a speed of 1 m/sec.

The pellets were finally processed in an extruder having a flat head to obtain a sheet having a thickness of 6000 μm; the sheet was found suitable for thermoforming.

The invention claimed is:

1. A biodegradable heterophase polymeric composition having good resistance to ageing and to low humidity conditions, the composition comprising
    a thermoplastic starch
    a thermoplastic polymer incompatible with starch, wherein the starch is in a dispersed phase and the thermoplastic polymer is in a continuous phase, and
    an interfacial agent which is an ester having an hydrophilic/lipophilic balance index value (HLB) greater than 8, which ester is obtained from a polyol or a mono- or polycarboxylic acid having a dissociation constant pK lower than 4.5, wherein the pK value refers to the first carboxyl group of the polycarboxylic acid.

2. The composition according to claim 1, wherein in the polyol portion of the ester comprises 3 or more carbon atoms and 2 or more alcohol groups.

3. The composition according to claim 2, in which the polyol is glycerol.

4. The composition according to claims 2 or 3, in which the ester is a monoglyceride.

5. The composition according to claim 2, in which the ester is an ester of oxalic, malonic, succinic, adipic, glutaric, maleic, citric, tartaric, lactic, or mono- di-, or tri-chloroacetic acid.

6. The composition according to claim 5, in which the ester is on average the monoglyceride.

7. The composition according to claim 1, in which the ratio by weight between the thermoplastic starch and the thermoplastic polymer incompatible with starch is such that the starch constitutes the dispersed phase and the thermoplastic polymer constitutes the continuous phase.

8. The composition according to claim 1, in which the quantities of the esters used are from 0.5 to 20% by weight relative to the total composition.

9. The composition according to claim 1 further comprising a plasticizer.

10. The composition according to claim 9, in which the plasticizer is selected from polyols with 3 or more carbon atoms and with 2 or more alcohol groups.

11. The composition according to claim 10, in which the polyol is selected from glycerol, sorbitol, etherified or esterified sorbitol, ethyleneglycol and trimethylolpropane.

12. The composition according to claim 9, in which the plasticizer is present in the composition from 1 to 100% by weight relative to the starch.

13. The composition according to claim 1, in which the ester is present in the composition in a ratio of from 1:30 to 1:2.5 by weight to the starch.

14. The composition according to claim 1, in which the thermoplastic polymer is an aliphatic or aliphatic-aromatic polyester, which is obtained by a reaction selected from a polycondensation of hydroxyacids with 2 or more carbon atoms, or from the corresponding lactones or lactides, a polycondensation of a diol with 1–12 carbon atoms with a dicarboxylic aliphatic acid or with mixtures thereof with dicarboxylic aromatic acids.

15. The composition according to claim 14, in which the polymer is a poly-$\epsilon$-caprolactone.

16. A film produced from a composition of claim 1.

17. A consumer product comprising a film according to claim 16, wherein the consumer product is selected from the group consisting of nappies, sanitary towels, bags, laminated paper, laminates and films treated with inorganic products.

18. Compositions comprising a film according to claim 16.

19. The composition according to claim 10 wherein the polyol is etherified or esterified.

* * * * *